US009249287B2

(12) United States Patent
Muraoka et al.

(10) Patent No.: US 9,249,287 B2
(45) Date of Patent: Feb. 2, 2016

(54) DOCUMENT EVALUATION APPARATUS, DOCUMENT EVALUATION METHOD, AND COMPUTER-READABLE RECORDING MEDIUM USING MISSING PATTERNS

(71) Applicants: Yusuke Muraoka, Tokyo (JP); Dai Kusui, Tokyo (JP); Yukitaka Kusumura, Tokyo (JP); Hironori Mizuguchi, Tokyo (JP)

(72) Inventors: Yusuke Muraoka, Tokyo (JP); Dai Kusui, Tokyo (JP); Yukitaka Kusumura, Tokyo (JP); Hironori Mizuguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 14/002,692

(22) PCT Filed: Feb. 18, 2013

(86) PCT No.: PCT/JP2013/053856
§ 371 (c)(1),
(2) Date: Aug. 30, 2013

(87) PCT Pub. No.: WO2013/125482
PCT Pub. Date: Aug. 29, 2013

(65) Prior Publication Data
US 2013/0332401 A1    Dec. 12, 2013

(30) Foreign Application Priority Data

Feb. 24, 2012    (JP) .................................. 2012-038286

(51) Int. Cl.
*G06F 15/18* (2006.01)
*C08L 23/06* (2006.01)
(Continued)

(52) U.S. Cl.
CPC .................. *C08L 23/06* (2013.01); *B29C 43/24* (2013.01); *B29C 45/0013* (2013.01);
(Continued)

(58) Field of Classification Search
None
See application file for complete search history.

(56) References Cited

U.S. PATENT DOCUMENTS

2011/0258195 A1* 10/2011 Welling et al. ................ 707/740

FOREIGN PATENT DOCUMENTS

| JP | 2000-40079 A | 2/2000 |
| JP | 2001-312501 A | 11/2001 |

(Continued)

OTHER PUBLICATIONS

Poolsawad et al. "Feature Selection Approaches with Missing Values Handling for Data Mining—A Case Study of Heart Failure Dataset", World Academy of Science, Engineering and Technology vol. 5 2011, pp. 531-540.*

(Continued)

*Primary Examiner* — Li-Wu Chang
(74) *Attorney, Agent, or Firm* — Wilmer Cutler Pickering Hale and Dorr LLP

(57) ABSTRACT

In order to accurately learn a function for evaluating documents, even in the case where sample documents having missing feature values are included as training data, a document evaluation apparatus is provided with a data classification unit (3) that classifies a set of sample documents based on missing patterns of a first feature vector, a first learning unit (4) that uses feature values that are not missing in the first feature vector and evaluation values to learn a first function for calculating a first score which is a weighted evaluation value for each classification, a feature vector generation unit (5) that computes a feature value corresponding to each classification using the first score, and generates a second feature vector having the computed feature values, and a second learning unit (6) that uses the second feature vector and the evaluation values to learn a second function for calculating a second score for evaluating documents targeted for evaluation.

9 Claims, 14 Drawing Sheets

(51) Int. Cl.
  *B29C 47/00* (2006.01)
  *C08J 3/22* (2006.01)
  *G06N 3/08* (2006.01)
  *B29C 43/24* (2006.01)
  *B29C 45/00* (2006.01)

(52) U.S. Cl.
  CPC ........ *B29C 47/0004* (2013.01); *B29C 47/0038* (2013.01); *C08J 3/226* (2013.01); *G06N 3/08* (2013.01); *B29C 47/0009* (2013.01); *B29C 47/0019* (2013.01); *B29C 47/0021* (2013.01); *B29C 47/0023* (2013.01)

(56) References Cited

FOREIGN PATENT DOCUMENTS

| | | |
|---|---|---|
| JP | 2008-234352 | 10/2008 |
| JP | 2010146171 A | 7/2010 |
| WO | WO-2010/016313 A1 | 2/2010 |

OTHER PUBLICATIONS

Japanese Office Action issued in corresponding Japanese Application No. 2013-536946, dated Sep. 25, 2013, 3 pages.
Written Opinion mailed Mar. 19, 2013 for PCT/JP2013/053856.
International Search Report mailed Mar. 19, 2013 for PCT/JP2013/053856.

\* cited by examiner

FIG. 5

| Document ID | F1: Update date/time | F2: Query/ document similarity | F3: Author reliability | F4: Query/ question portion similarity | F5: Resolved? | Evaluation value |
|---|---|---|---|---|---|---|
| 1 | 500 | 0.01 | NA | NA | 1 | 2 |
| 2 | 450 | 0.05 | 50 | 0.1 | 1 | 3 |
| 3 | 400 | 0.1 | NA | 0.1 | 1 | 2 |
| 4 | 400 | 0.05 | NA | 0.05 | 0 | 1 |
| 5 | 450 | 0.2 | -10 | 0 | 0 | -2 |
| 6 | 400 | 0.2 | 5 | NA | 0 | 0 |
| . | . | . | . | . | . | . |
| . | . | . | . | . | . | . |
| . | . | . | . | . | . | . |

FIG. 6

| Missing Pattern | Appearance Frequency |
|---|---|
| Not missing | 1000 |
| F3 | 200 |
| F4 | 20 |
| F3,F4 | 150 |

FIG. 7

| Class No. | Missing Pattern |
|---|---|
| 1 | Not missing |
| 2 | F3 |
| 3 | F3,F4 |

FIG. 8

| Document ID | F1: Update date/time | F2: Query/ document similarity | F3: Author reliability | F4: Query/ question portion similarity | F5: Resolved? | Evaluation value |
|---|---|---|---|---|---|---|
| 1 | 500 | 0.01 | NA | NA | 1 | 2 |
| 2 | 450 | 0.05 | 50 | 0.1 | 1 | 3 |
| 3 | 400 | 0.1 | NA | 0.1 | 1 | 2 |
| 4 | 400 | 0.05 | NA | 0.05 | 0 | 1 |
| 5 | 450 | 0.2 | -10 | 0 | 0 | -2 |
| 6 | 400 | 0.2 | 5 | 0.02 | 0 | 0 |
| . | . | . | . | . | . | . |
| . | . | . | . | . | . | . |
| . | . | . | . | . | . | . |

FIG. 9

| Document ID | F1: Update date/time | F2: Query/ document similarity | F3: Author reliability | F4: Query/ question portion similarity | F5: Resolved? | Evaluation value | Class No. |
|---|---|---|---|---|---|---|---|
| 1 | 500 | 0.01 | NA | NA | 1 | 2 | 3 |
| 2 | 450 | 0.05 | 50 | 0.1 | 1 | 3 | 1 |
| 3 | 400 | 0.1 | NA | 0.1 | 1 | 2 | 2 |
| 4 | 400 | 0.05 | NA | 0.05 | 0 | 1 | 2 |
| 5 | 450 | 0.2 | −10 | 0 | 0 | −2 | 1 |
| 6 | 400 | 0.2 | 5 | 0.02 | 0 | 0 | 1 |
| . | . | . | . | . | . | . | . |
| . | . | . | . | . | . | . | . |
| . | . | . | . | . | . | . | . |

FIG. 10

| Document ID | F1: Update date/time | F2: Query/ document similarity | F3: Author reliability | F4: Query/ question portion similarity | F5: Resolved? | Evaluation value | Class No. | 1st score |
|---|---|---|---|---|---|---|---|---|
| 1 | 500 | 0.01 | NA | NA | 1 | 2 | 3 | 3.35 |
| 2 | 450 | 0.05 | 50 | 0.1 | 1 | 3 | 1 | 5.795 |
| 3 | 400 | 0.1 | NA | 0.1 | 1 | 2 | 2 | 1.4 |
| 4 | 400 | 0.05 | NA | 0.05 | 0 | 1 | 2 | 0.2 |
| 5 | 450 | 0.2 | -10 | 0 | 0 | -2 | 1 | -0.355 |
| 6 | 400 | 0.2 | 5 | 0.02 | 0 | 0 | 1 | 1.16 |
| . | . | . | . | . | . | . | . | . |
| . | . | . | . | . | . | . | . | . |
| . | . | . | . | . | . | . | . | . |

FIG. 11

| Document ID | G1 | G2 | G3 | Evaluation value |
|---|---|---|---|---|
| 1 | 0 | 0 | 0.88 | 2 |
| 2 | 0.9 | 0 | 0 | 3 |
| 3 | 0 | 0.95 | 0 | 2 |
| 4 | 0 | 0.5 | 0 | 1 |
| 5 | 0.05 | 0 | 0 | -2 |
| 6 | 0.3 | 0 | 0 | 0 |
| . | . | . | . | . |
| . | . | . | . | . |
| . | . | . | . | . |

FIG. 12

| Document ID | F1: Update date/time | F2: Query/ document similarity | F3: Author reliability | F4: Query/ question portion similarity | F5: Resolved? |
|---|---|---|---|---|---|
| 1371 | 500 | 0.01 | NA | NA | 1 |

FIG. 13

| Document ID | G1 | G2 | G3 |
|---|---|---|---|
| 1371 | 0 | 0 | 0.203 |

DOCUMENT EVALUATION APPARATUS, DOCUMENT EVALUATION METHOD, AND COMPUTER-READABLE RECORDING MEDIUM USING MISSING PATTERNS

RELATED APPLICATIONS

The present application is a national stage entry of International Application No. PCT/JP2013/053856, filed on Feb. 18, 2013, which claims priority from Japanese Patent Application No. JP 2012 -38286, filed on Feb. 24, 2012. Both applications are incorporated herein by reference in their entirety.

TECHNICAL FIELD

The present invention relates to a document evaluation apparatus, a document evaluation method, and a computer-readable recording medium storing a program for realizing the apparatus and method, and more particularly to a document evaluation apparatus that is capable of learning even in the case where the values of part of a feature vector of training data are missing when evaluating documents, a document evaluation method, and a computer-readable recording medium.

BACKGROUND ART

In a retrieval system, the ranking of search result documents is important, in order to quickly find a target document. A ranking technique that is generally known involves documents that have been favorably evaluated by a large number of evaluators being ranked higher.

Incidentally, with the abovementioned ranking technique, there is a problem in that documents that have hardly been evaluated or have yet to be evaluated, such as documents that have only recently been created, will be unfairly ranked lower (or higher). In view of this, a technique is known in which the evaluation value of documents is estimated from feature values such as the author of documents or the creation date/time of documents, through learning using a log of user evaluations of documents, and these evaluation values are used in ranking.

However, these feature values may be missing due to factors such as recording omissions. When feature values are missing in this way, learning is not possible with a normal learning algorithm. In response to such problems, Patent Document 1 describes an example of a learning system that handles training data in which feature values are missing.

As shown in FIG. 14, a learning system 10 described in this Patent Document 1 is constituted by a missing value supplementing unit 11 and a prediction model learning unit 12, and operates as follows. First, the missing value supplementing unit 11 receives input of training data containing both sample documents in which feature values are missing and sample documents in which feature values are not missing. Then, the missing value supplementing unit 11 learns a function for estimating missing feature values from other feature values, using the sample documents in which feature values are not missing as inputs.

Next, the missing feature values are supplemented using the estimated function, and a set of sample documents in which missing values have been supplemented is output to the prediction model learning unit 12. The prediction model learning unit 12 then learns a function for estimating a target variable based on feature values, using training data containing the sample documents in which missing values have been supplemented. As mentioned above, in the learning system 10 described in the abovementioned Patent Document 1, if sample documents in which feature values are missing are included in training data, a function for estimating the target variable is learned after supplementing the missing feature values.

CITATION LIST

Patent Document

Patent Document 1: JP 2008-234352A

DISCLOSURE OF THE INVENTION

Problem to be Solved by the Invention

However, the following problem arises with function learning according to the abovementioned Patent Document 1, in the case where the missing feature values greatly influence the evaluation of documents. That is, although function learning is performed after supplementing the missing feature values, the function that is learned may be a function in which these feature values contribute little to the evaluation. As a result, there is a problem in that documents in which feature values are missing may be unfairly ranked lower or higher, compared with documents in which feature values are not missing.

In view of this, an exemplary object of the present invention is to provide a document evaluation apparatus that is able to accurately learn a function for evaluating documents, even in the case where sample documents in which feature values are missing are included as training data, a document evaluation method, and a computer-readable recording medium.

Means for Solving the Problem

In order to attain the above object, a document evaluation apparatus according to one aspect of the present invention is a document evaluation apparatus for evaluating a document using a set of sample documents having a first feature vector consisting of a plurality of feature values and evaluation values of the documents, including a data classification unit that classifies the set of sample documents, based on a missing pattern indicating a set of indices whose feature values are missing in the first feature vector, a first learning unit that uses feature values that are not missing in the first feature vector and the evaluation values to learn, for each classification, a first function for calculating a first score which is a weighted evaluation value for each classification, a feature vector generation unit that computes a feature value corresponding to each classification using the first score, and generates a second feature vector having the computed feature values, and a second learning unit that uses the second feature vector and the evaluation values to learn a second function for calculating a second score for evaluating a document targeted for evaluation.

Also, in order to attain the above object, a document evaluation method according to one aspect of the present invention is a document evaluation method for evaluating a document using a set of sample documents having a first feature vector consisting of a plurality of feature values and evaluation values of the documents, including the steps of (a) classifying the set of sample documents, based on a missing pattern indicating a set of indices whose feature values are missing in the first feature vector, (b) using feature values that are not missing in the first feature vector and the evaluation values to learn, for each classification, a first function for calculating a first score which is a weighted evaluation value for each classification, (c) computing a feature value corresponding to each classification using the first score, and generating a second feature vector having the computed feature values, and (d) using the second feature vector and the evaluation values to learn a second function for calculating a second score for evaluating a document targeted for evaluation.

Furthermore, in order to attain the above object, a computer-readable recording medium according to one aspect of the present invention is a computer-readable recording medium storing a program for evaluating by computer a document using a set of sample documents having a first feature vector consisting of a plurality of feature values and evaluation values of the documents, the program including commands for causing the computer to execute the steps of (a) classifying the set of sample documents, based on a missing pattern indicating a set of indices whose feature values are missing in the first feature vector, (b) using feature values that are not missing in the first feature vector and the evaluation values to learn, for each classification, a first function for calculating a first score which is a weighted evaluation value for each classification, (c) computing a feature value corresponding to each classification using the first score, and generating a second feature vector having the computed feature values, and (d) using the second feature vector and the evaluation values to learn a second function for calculating a second score for evaluating a document targeted for evaluation.

Effects of the Invention

The present invention, as described above, enables a function for evaluating documents to be accurately learned, even in the case where sample documents in which feature values are missing are included as training data.

BRIEF DESCRIPTION OF DRAWINGS

FIG. 5 is a diagram showing exemplary feature values and evaluation values of sample documents according to the embodiment of the present invention.

FIG. 6 is a diagram showing appearance frequency data according to the embodiment of the present invention.

FIG. 7 is a diagram showing data registered in a missing pattern storage unit in the embodiment of the present invention.

FIG. 8 is a diagram showing data that is output by a missing pattern reduction unit in the embodiment of the present invention.

FIG. 9 is a diagram showing data that is output by a data classification unit in the embodiment of the present invention.

FIG. 10 is a diagram showing data that is output by a first learning unit in the embodiment of the present invention.

FIG. 11 is a diagram showing data that is output by a feature vector generation unit in the embodiment of the present invention.

FIG. 12 is a diagram showing data of a document that is input to a ranking unit in the embodiment of the present invention.

FIG. 13 is a diagram showing data of a second feature vector generated by the ranking unit in the embodiment of the present invention.

DESCRIPTION OF EMBODIMENTS

Embodiments

Next, a document evaluation apparatus, a document evaluation method, and a program according to an embodiment of the present invention will be described in detail with reference to FIGS. 1 to 4.

Document Evaluation Apparatus

Figure 1:
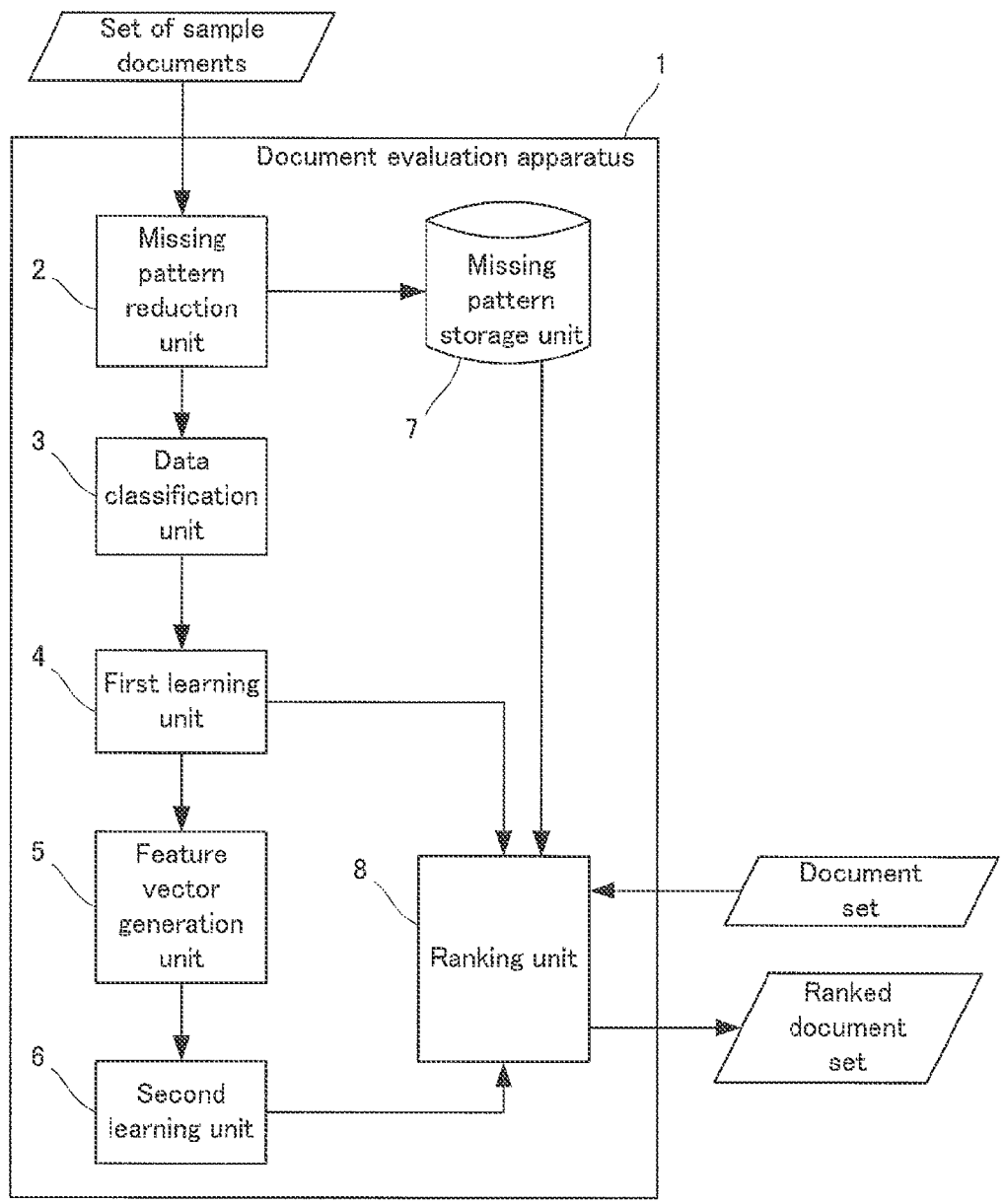
FIG. 1 is a block diagram showing a configuration of a document evaluation apparatus according to an embodiment of the present invention.

First, the configuration of a document evaluation apparatus 1 according to the present invention will be described using FIG. 1. FIG. 1 is a block diagram showing the configuration of the document evaluation apparatus according to the embodiment of the present invention.

As shown in FIG. 1, the document evaluation apparatus 1 according to the embodiment of the present invention is for evaluating documents using a set of sample documents having a first feature vector consisting of a plurality of feature values and evaluation values of the documents. This document evaluation apparatus 1 is provided with a data classification unit 3, a first learning unit 4, a feature vector generation unit 5, and a second learning unit 6.

The data classification unit 3 classifies the set of sample documents, based on a missing pattern showing the pattern of feature values that are missing in the first feature vector. The first learning unit 4 learns, for each classification, a first function for calculating a first score which is a weighted evaluation value for each classification, using the feature values that are not missing in the first feature vector and the evaluation values.

The feature vector generation unit 5 generates a second feature vector having feature values corresponding to the classifications. Each of these feature values is computed using the first score belonging to the corresponding classification. The second learning unit 6 learns a second function for calculating a second score that is for evaluating a document targeted for evaluation, using the second feature vector and the evaluation values.

In this way, the document evaluation apparatus 1 ultimately learns a second function for computing the second score, based on feature values that are not missing and the evaluation values of documents. Since this second function is learned without supplementing missing feature values with other values, documents can be evaluated with emphasis on feature values that greatly influence the evaluation.

Here, the configuration of the document evaluation apparatus 1 will be described more specifically. As shown in FIG. 1, in the present embodiment, the document evaluation apparatus 1 is further provided with a missing pattern reduction unit 2, a missing pattern storage unit 7, and a ranking unit 8. Note that a sample document according to the present embodiment includes a first feature vector consisting of a plurality of feature values and an evaluation value of the sample document, and is used as training data. An evaluation value of a sample document refers to, for example, an evaluation recorded by a user who has read the document, the number of times the document has been viewed and the number of posted links. Also, feature values of a sample document include, for example, the date and time at which the document was updated, the similarity between a query and the document and the reliability of the author.

The missing pattern storage unit 7 stores a missing pattern indicating the pattern of missing feature values. Exemplary missing patterns include a pattern in which update date and time is missing, a pattern in which update date and time and author reliability are missing, and a pattern in which neither of these feature values is missing.

The missing pattern reduction unit 2 reduces the number of missing patterns, by changing missing patterns having a low appearance frequency to match missing patterns having a high appearance frequency. Specifically, the missing pattern reduction unit 2 first receives input of a set of sample documents and a threshold parameter. The missing pattern reduction unit 2 then counts the appearance frequency of the sample documents for each missing pattern.

The missing pattern reduction unit 2 registers missing patterns whose appearance frequency is greater than the threshold parameter in the missing pattern storage unit 7. The missing pattern reduction unit 2 then directly outputs the sample documents having the missing patterns registered in this missing pattern storage unit 7 (registered missing patterns) to the downstream data classification unit 3.

On the other hand, the missing pattern reduction unit 2 outputs sample documents having a missing pattern whose appearance frequency is less than or equal to the threshold parameter, that is, a missing pattern that is not registered in the missing pattern storage unit 7 (unregistered missing pattern), to the downstream data classification unit 3 after performing the following processing.

First, the missing pattern reduction unit 2 refers to the missing pattern storage unit 7, and selects a registered missing pattern having the smallest difference from the unregistered missing pattern. The missing pattern reduction unit 2 then changes the missing pattern of the unregistered missing pattern so as to match the registered missing pattern that was selected.

Specifically, the missing pattern reduction unit 2 estimates the missing feature values of the unregistered missing pattern and changes these feature values so that they are not missing, or changes feature values of the unregistered missing pattern that are not missing so that they are missing. As a result, the missing pattern reduction unit 2 matches the unregistered missing pattern to the registered missing pattern that was selected.

Note that a function for estimating missing feature values from other feature values, for example, may be used in estimating missing feature values. The missing pattern reduction unit 2 is able to learn this function using sample documents in which the feature value to be estimated is not missing, among the set of sample documents. Linear regression or support vector regression (SVR), for example, can be used in this learning. The missing pattern reduction unit 2 is also able to compute a representative value such as the mean or mode from a plurality of sample documents in which the feature value to be estimated is not missing, and estimate the computed representative value as the missing feature value.

The data classification unit 3, in the present embodiment, classifies each sample document according to the missing patterns, and outputs a set of sample documents that have been associated with these classification results to the downstream first learning unit 4.

The first learning unit 4, in the present embodiment, learns the first function for each classification that is classified by the data classification unit 3, based on the feature values that are not missing and the evaluation values. Each first function is an function for calculating a first score for each sample document from feature values that are not missing. The first score is a score that increases the higher the evaluation value of the sample document, and is a weighted evaluation value for each classification.

Specifically, the first learning unit 4 is able to learn the first function by machine learning. A method such as linear regression or support vector regression (SVR) in which a first function for predicting a first score from the feature values in each sample document that are not missing, with the evaluation value of the document as the first score, for example, can be used as the machine learning method. Note that a method described in "A tutorial on Support Vector Regression" by Alex J. Smola and Bernhard Schölkopf", for example, can be used as a learning method based on support vector regression.

Also, as another machine learning method, a method (pairwise method; e.g. ranking SVM) for learning a first function according to which a sample document having a higher evaluation value will have a higher first score when two sample documents are compared, for example, can also be used. As yet another machine learning method, a method (listwise method; e.g., ListNet) for learning a first function according to which a list of sample documents is arranged in descending order of evaluation values, and the first score increases in that order. Note that with regard to a method of learning the first function by ranking SVM, the method described in "A Support Vector Method for Multivariate Performance Measures" by T. Joachim can be used. Also, with regard to a method for learning the first function by ListNet, the method described in "Learning to rank: from pairwise approach to listwise approach" by Z. Cao, T. Qin, T.-Y. Liu, M.-F. Tsai, and H. Li can be used.

The first learning unit 4 then associates the first scores with respective sample documents input from the data classification unit 3, and outputs the sample documents to which the first scores are associated to the downstream feature vector generation unit 5.

The feature vector generation unit 5, in the present embodiment, computes each of feature values constituting a second feature vector from the first score belonging to the corresponding classification. Here, the feature values may be normalized values so that the first scores fall within a predetermined range.

The second learning unit 6, in the present embodiment, learns a second function so that a second score computed by the second function increases the higher the evaluation value of the sample document. The second learning unit 6 is able to learn the second function by machine learning. For example, the second learning unit 6 is able to learn the second function by methods such as the above-mentioned linear regression, support vector regression, ranking SVM or ListNet.

When a set of documents and a first feature vector of each document are input, the ranking unit 8 calculates a second score for each document using the second function, ranks the documents based on the second scores, and outputs the ranked documents.

Specifically, the ranking unit 8 first determines whether the missing pattern of each input document is registered in the missing pattern storage unit 7, that is, matches a registered missing pattern.

If the missing pattern of the input document matches a registered missing pattern, the ranking unit 8 first computes a first score using the first function output by the first learning unit. Next, the ranking unit 8 generates the second feature vector using these first scores. The ranking unit 8 then calculates a second score for each document from the second feature vector, using the second function output by the second learning unit 6. The ranking unit 8 then outputs a set of documents arranged in descending order of the second scores.

On the other hand, if the missing pattern of the input document does not match a registered missing pattern, the ranking unit 8 performs processing for matching the missing pattern to a missing pattern having the smallest difference therewith among the missing patterns registered in the missing pattern storage unit 7, similarly to the missing pattern reduction unit 2. The ranking unit 8 then calculates the second score for the input document similarly to the case where the missing pattern matches a registered missing pattern, and outputs a set of documents that are arranged in descending order of the second scores.

Operation of Document Evaluation Apparatus

Next, operation of the document evaluation apparatus 1 according to an embodiment of the present invention will be described using FIGS. 2 and 3, taking FIG. 1 into consideration as appropriate. Note that, in the present embodiment, since the document evaluation method is implemented by operating the document evaluation apparatus 1, description of the document evaluation method according to the present embodiment is replaced with the following description of the operations of the document evaluation apparatus 1.

Initially, operations for learning the first function and the second function that are used when the document evaluation apparatus 1 evaluates a document will be described with reference to FIG. 2. FIG. 2 is a flowchart showing operations performed by the document evaluation apparatus 1 according to the embodiment of the present invention for learning the first function and the second function. As shown in FIG. 2, first, the missing pattern reduction unit 2 receives input of a set of sample documents and a threshold parameter (step A1).

Next, the missing pattern reduction unit 2 specifies the missing pattern of each sample document, counts the appearance frequency of sample documents for each missing pattern, and registers missing patterns whose appearance frequency is greater than the threshold parameter in the missing pattern storage unit 7 (step A2).

Next, the missing pattern reduction unit 2 extracts a missing pattern that is not registered, that is, a missing pattern whose appearance frequency is less than or equal to the threshold parameter (unregistered missing pattern). The missing pattern reduction unit 2 selects a missing pattern having the smallest difference from the unregistered missing pattern, from among the missing patterns registered in the missing pattern storage unit 7 (registered missing patterns). The missing pattern reduction unit 2 then changes the missing pattern of the unregistered missing pattern that was extracted, so as to match the registered missing pattern that was selected (step A3).

As described above, the missing pattern reduction unit 2 changes the missing pattern of sample documents having an unregistered missing pattern, and outputs the changed missing pattern to the data classification unit 3. On the other hand, the missing pattern reduction unit 2 directly outputs the missing pattern of sample documents already having a registered missing pattern to the data classification unit 3.

Next, the data classification unit 3 classifies each input sample document according to the missing patterns (step A4). The data classification unit 3 then outputs a set of sample documents to which the classification results are associated to the first learning unit 4.

Then, the first learning unit 4 learns, for each classification, the first function for calculating the first score, using feature values that are not missing and evaluation values (step A5).

The first learning unit 4 then associates the first scores with each sample document input from the data classification unit 3, using the first function obtained by learning, and outputs a set of sample documents in which the classifications and the first scores are associated to the feature vector generation unit 5.

Next, the feature vector generation unit 5 generates the second feature vector using the first scores (step A6). The feature vector generation unit 5 then outputs the second feature vector and the evaluation values of the documents to the second learning unit 6.

Next, the second learning unit 6 learns a second function for calculating a second score that increases the higher the evaluation value of the sample document, based on the second feature vector and the evaluation value (step A7).

Next, an operation performed by the document evaluation apparatus 1 for ranking input documents using the first function and the second function will be described with reference to FIG. 3. FIG. 3 is a flowchart showing operations performed by the document evaluation apparatus 1 according to the embodiment of the present invention for ranking input documents.

Figure 3:
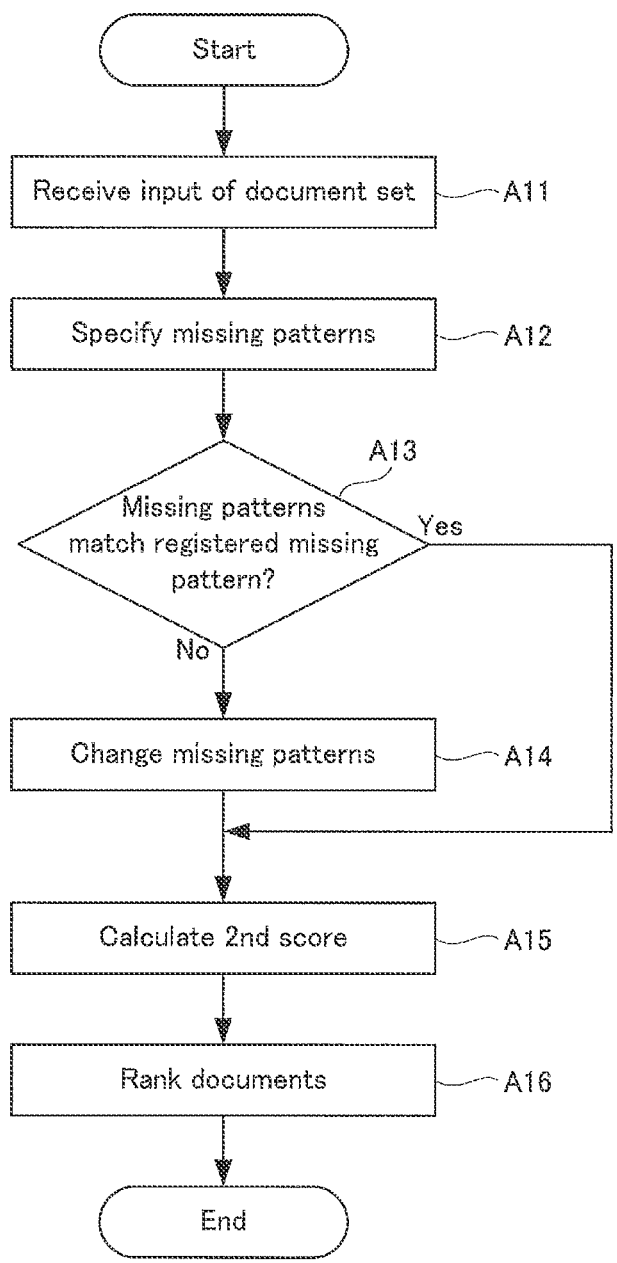
FIG. 3 is a flowchart showing some of the operations of the document evaluation apparatus according to the embodiment of the present invention.

As shown in FIG. 3, the ranking unit 8 receives input of a document set to be targeted for ranking and the first feature vector of each document (step A11). The ranking unit 8, on receiving input of the document set, specifies the missing pattern of each document (step A12).

The ranking unit 8 refers to the missing pattern storage unit 7, and determines whether the missing pattern of each document specified in step A12 corresponds with a registered missing pattern (step A13).

The ranking unit 8 executes step A15 discussed later without changing the missing pattern of documents having a missing pattern that matches a registered missing pattern. On the other hand, the ranking unit 8 executes the following step A14 for document having an unregistered missing pattern.

In step A14, the ranking unit 8 selects a registered missing pattern having the smallest difference from the missing pattern of each document having an unregistered missing pattern, from among the missing patterns registered in the missing pattern storage unit 7. The ranking unit 8 then changes the missing pattern of the document, by estimating and supplementing the missing feature values of the document and converting feature values that are not missing to a missing state. As a result, the ranking unit 8 matches the missing pattern of each document with a registered missing pattern.

Next, the ranking unit 8 calculates the second score using the learning result output by the first learning unit 4 and the learning result output by the second learning unit 6, that is, the first function and the second function, and associates this second score with each document (step A15).

The ranking unit 8 ranks the documents in descending order of the second scores calculated at step A15, and outputs a ranked document set to the outside (step A16).

Hereinabove, according to the document evaluation apparatus 1 of the present embodiment, even if a document has a missing feature value, the second function can be learned without supplementing the missing feature value. Thus, documents can be evaluated with emphasis on feature values that greatly influence the evaluation, by evaluating documents using the second score computed from the second function.

Also, the document evaluation apparatus 1 of the present embodiment ranks documents by the second score obtained by the feature vector generation unit 5 and the second learning unit 6, rather than ranking documents from the first score obtained by the first learning unit 4. A set of documents can thus be ranked such that documents that are similar to highly evaluated sample documents will be ranked higher relative to the entire set of documents regardless of classification, rather than ranking the documents per classification.

Also, the document evaluation apparatus 1 of the present embodiment is able to reduce the number of missing patterns, as a result of the missing pattern reduction unit 2 changing the missing pattern of sample documents having a low appearance frequency to a missing pattern having a high appearance frequency. The document evaluation apparatus 1 is thus efficiently learn the second function, even in the case where the dimension of the first feature vector increases and the types of missing patterns increase.

Program

Figure 2:
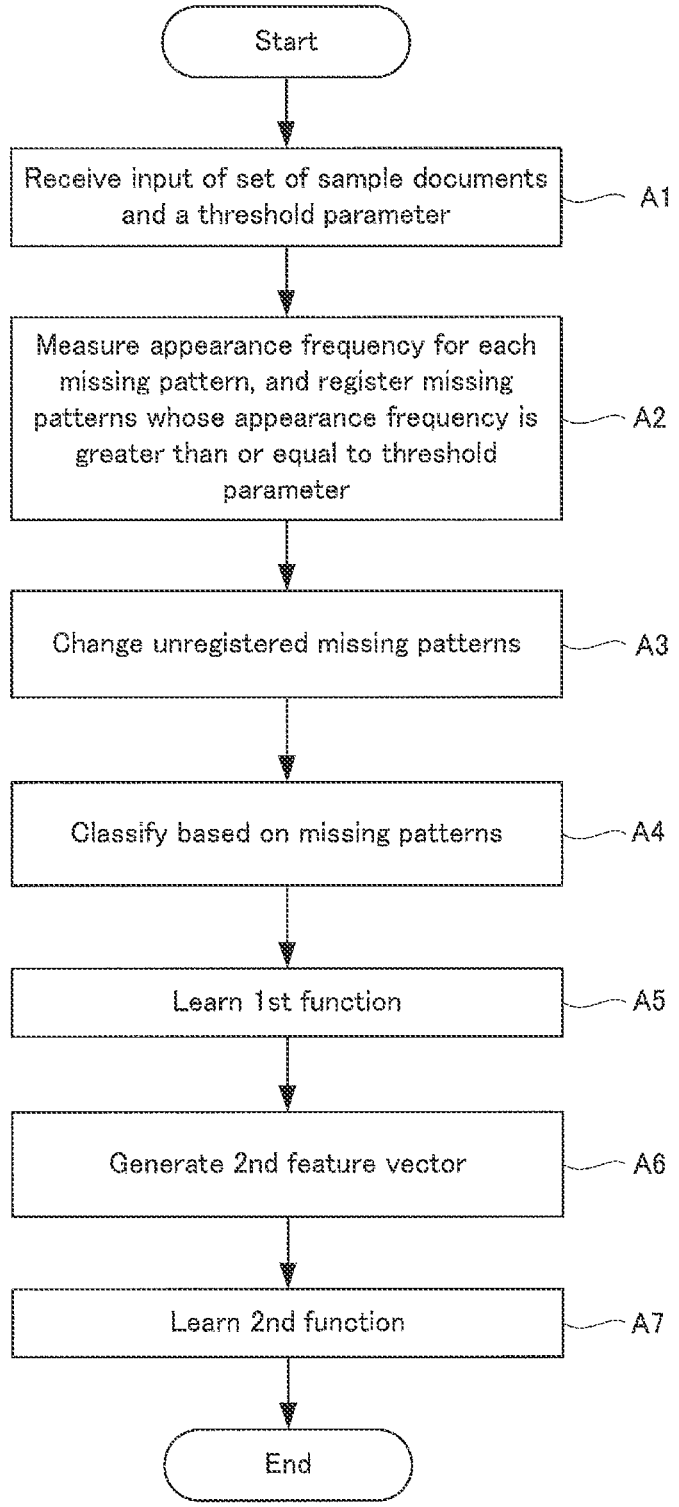
FIG. 2 is a flowchart showing some of the operations of the document evaluation apparatus according to the embodiment of the present invention.

A program according to the embodiment of the present invention need only be a program that causes a computer to execute steps A1 to A7 shown in FIG. 2 and steps A11 to A16 shown in FIG. 3. The document evaluation apparatus and the document evaluation method according to the present embodiment can be realized by installing this program on a computer and executing the installed program. In this case, a CPU (Central Processing Unit) of the computer functions as the missing pattern reduction unit 2, the data classification unit 3, the first learning unit 4, the feature vector generation unit 5, the second learning unit 6 and ranking unit 8, and performs processing. Also, a storage device provided in the computer functions as the missing pattern storage unit 7.

Computer

Figure 4:
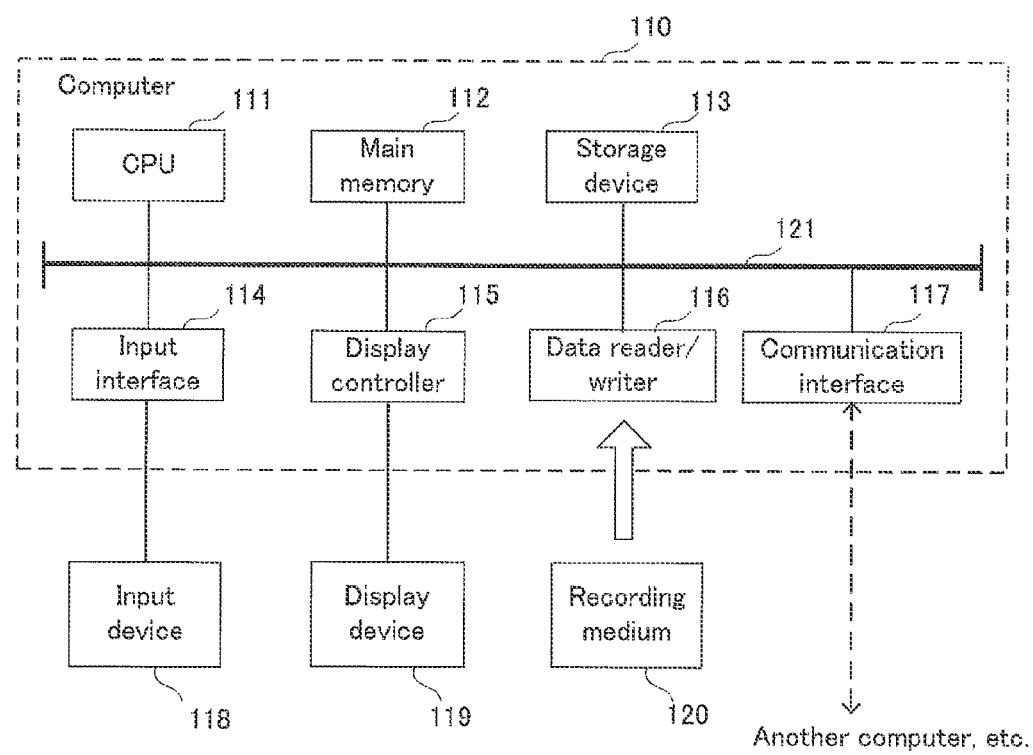
FIG. 4 is a block diagram showing an exemplary computer for realizing the document evaluation apparatus according to the embodiment of the present invention.
Figure 14:
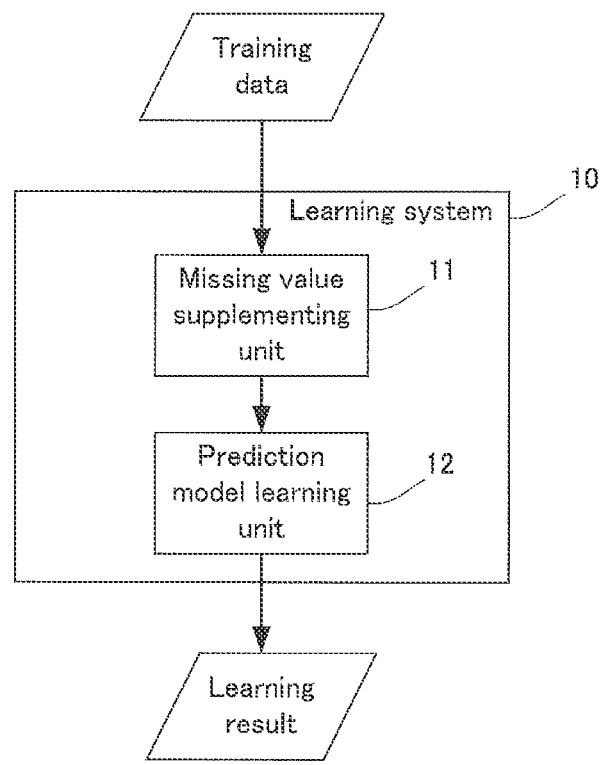
FIG. 14 is a block diagram showing a configuration of a learning system described in Patent Document 1.

Here, a computer that realizes the document evaluation apparatus 1 by executing the program according to the present embodiment will be described using FIG. 4. FIG. 4 is a block diagram showing an example of a computer that realizes the document evaluation apparatus according to the embodiment of the present invention.

As shown in FIG. 4, a computer 110 is provided with a CPU 111, a main memory 112, a storage device 113, an input interface 114, a display controller 115, a data reader/writer 116, and a communication interface 117. These units are connected to each other so as to enable data communication via a bus 121.

The CPU 111 implements various types of arithmetic operations by expanding the program (codes) according to the present embodiment stored in the storage device 113 in the main memory 112, and executing these codes in a predetermined order. The main memory 112, typically, is a volatile storage device such as DRAM (Dynamic Random Access Memory). Also, the program according to the present embodiment is provided in a state of being stored on a computer-readable recording medium 120. Note that the program according to the present embodiment may also be distributed over the Internet connected via the communication interface 117.

Also, specific examples of the storage device 113 include a semiconductor memory device such as a flash memory, apart from a hard disk. The input interface 114 mediates data transmission between the CPU 111 and an input device 118 consisting of a keyboard and a mouse. The display controller 115 is connected to a display device 119 and controls display on the display device 119. The data reader/writer 116 mediates data transmission between the CPU 111 and the recording medium 120, and executes reading out of programs from the recording medium 120 and writing of processing results of the computer 110 to the recording medium 120. The communication interface 117 mediates data transmission between the CPU 111 and another computer.

Also, specific examples of the recording medium 120 include a general-purpose semiconductor memory device such as a CF (Compact Flash (registered trademark)) card or a SD (Secure Digital) card, a magnetic storage medium such as a flexible disk, and an optical storage medium such as a CD-ROM (Compact Disk Read Only Memory).

Embodiment Example

Next, the operations of the document evaluation apparatus 1 according to the present invention will be specifically described using an embodiment example, with reference to FIGS. 2 and 3 and FIGS. 5 to 13. Note that, in the present embodiment example, documents containing questions and answers are targeted for ranking. Also, ranking is performed when displaying keyword search results.

Step A1

First, the missing pattern reduction unit 2 receives input of feature values, evaluation values and a threshold parameter of sample documents such as shown in FIG. 5 (step A1). Note that, in the present embodiment example, 1370 sample documents are used as training data, and, hereinafter, description will be given taking six sample documents having document IDs 1 to 6 as representative sample documents in order to simplify the description. Also, the threshold parameter is given as 100.

Each sample document includes an evaluation value and features values F1: update date and time (difference from a given time), F2: similarity between query and document, F3: reliability of author, F4: similarity between query and question portion, F5: whether problem is solved.

Here, an evaluation value is a value computed from evaluations recorded by users who have read the document, the number of views, or the number of the posted links. F2: similarity between query and document can be derived by cosine similarity. F4: similarity between query and question section is computed by a similarity measurement system automatically extracting a "question" portion in a document, and deriving the similarity between that portion and the query by cosine similarity. Note that the feature value of F4 is missing from documents in which "question" portion could not be extracted.

"NA" in FIG. 5 denotes that the feature value is missing. For example, with regard to "F3: reliability of author", there is an evaluation value if the author is registered as a user, but the feature value relating to F3 is missing if the author is not registered as a user.

Step A2

Next, the missing pattern reduction unit 2 executes step A2. That is, the missing pattern reduction unit 2 first specifies the missing pattern for each sample document, and counts the appearance frequency of sample documents for each missing pattern. A result of this counting is shown in FIG. 6.

As shown in FIG. 6, the appearance frequencies of three missing patterns, namely, the pattern "not missing", the pattern "only F3 missing", and the pattern "F3, F4 missing", are greater than the threshold parameter 100. The missing pattern reduction unit 2 thus determines that the appearance frequencies of the three missing patterns {not missing, (F3), (F3, F4)} are greater than the threshold parameter. The missing pattern reduction unit 2 then registers these three missing patterns in the missing pattern storage unit 7 as registered missing patterns. Note that the missing pattern storage unit 7 holds data as shown in FIG. 7, for example.

Step A3

Next, the missing pattern reduction unit 2 extracts sample documents whose missing pattern is an unregistered missing pattern from the input sample documents, and changes the missing pattern of these sample documents (step A3). To be specific, since the missing patterns of the sample documents having the document IDs 1, 2, 3, 4 and 5 match a registered missing pattern, the missing pattern reduction unit 2 does not change the missing pattern of these sample documents. On the other hand, since the missing pattern (pattern in which only F4 is missing) of the sample document having the document ID 6 is an unregistered missing pattern, the missing pattern reduction unit 2 extracts the sample document having this document ID 6, and performs the following processing.

The missing pattern reduction unit 2 selects the registered missing pattern having the smallest difference from the missing pattern of the sample document having the document ID 6. The missing pattern of the sample document having the document ID 6 is "only F4 missing". The registered missing pattern having the smallest difference from this missing pattern is the missing pattern "not missing" or the missing pattern "F3, F4 missing". Thus in the case where there are a plurality of candidate registered missing patterns, the missing pattern reduction unit 2 selects the missing pattern "not missing" that was registered earlier, for example, as the registered missing pattern having the smallest difference.

Next, the missing pattern reduction unit 2 estimates the feature value of F4 from the feature values of the features F1, F2, F3 and F5 of the sample document having the document ID 6 that are not missing, in order to match the sample document having the document ID 6 with a registered missing pattern "not missing". Note that, in the present embodiment example, the missing pattern reduction unit 2 estimates, by linear regression, the feature value $f_4$ of the feature F4 from the feature values $f_1$, $f_2$, $f_3$ and $f_5$ of the other features F1, F2, F3 and F5 as shown in the following equation (1).

$$f_4 = a_1 f_1 + a_2 f_2 + a_3 f_3 + a_5 f_5 + a_0 \qquad \text{Equation (1)}$$

Note that $a_0$, $a_1$, $a_2$, $a_3$ and $a_5$ can be derived from the following simultaneous equations of equation (2).

$$\begin{cases} \sum_i f_{\sigma_i 1}\left(f_{\sigma_i 4} - \sum_{k \in \{1,2,3,5\}} a_k f_{\sigma_i k} - a_0\right) = 0 \\ \sum_i f_{\sigma_i 2}\left(f_{\sigma_i 4} - \sum_{k \in \{1,2,3,5\}} a_k f_{\sigma_i k} - a_0\right) = 0 \\ \sum_i f_{\sigma_i 3}\left(f_{\sigma_i 4} - \sum_{k \in \{1,2,3,5\}} a_k f_{\sigma_i k} - a_0\right) = 0 \\ \sum_i f_{\sigma_i 5}\left(f_{\sigma_i 4} - \sum_{k \in \{1,2,3,5\}} a_k f_{\sigma_i k} - a_0\right) = 0 \\ \sum_i \left(f_{\sigma_i 4} - \sum_{k \in \{1,2,3,5\}} a_k f_{\sigma_i k} - a_0\right) = 0 \end{cases} \qquad \text{Equation (2)}$$

Here, the sample documents used in order to compute equation (1) are the sample document (having document IDs 2, 5, . . . ) whose feature values are not missing, and this document ID sequence is given as $\sigma 1$, $\sigma 2$, . . . from low to high numbers ($\sigma_1=2, \sigma_2=5, \ldots$). Also, the feature value of a feature Fk of a document ID n is given as $f_{nk}$. In this case, the feature value of the update date and time F1 of the document ID 2 is represented as $f\sigma_{11}$ (or $f_{21}$), for example.

In the present embodiment example, it is assumed that the feature value of F4 of the document ID 6 derived using the above equation (1) is 0.02. The missing pattern reduction unit 2 then sets the missing pattern of the sample document having the document ID 6 as a "not missing" pattern by supplementing with the feature value computed as described above, and outputs the data shown in FIG. 8.

Step A4

Next, the data classification unit 3 classifies each sample document based on the missing patterns, using the data of FIG. 8 output by the missing pattern reduction unit 2 as inputs, and outputs the data of FIG. 9 in which a classification number is assigned to each sample document (step A4).

Step A5

Next, the first learning unit 4 learns the first function for each classification, using the data of FIG. 9 output by the data classification unit 3 as inputs (step A5). That is, the first learning unit 4 learns a first function according to which the score increases the higher the evaluation value, from the feature values of the sample documents (ID 2, 5, 6, . . . ) having the classification number 1. An example of the function obtained as a result is shown in equation (4). Similarly, the first learning unit 4 learns an exemplary function shown in equation (5) as the first function from the feature values of the sample documents (ID3, 4, . . . ) having the classification number 2. Also, the first learning unit 4 learns an exemplary function shown in equation (6) as the first function from the feature values of the sample documents (ID1, . . . ) having the classification number 3.

Note that equations (4) to (6) can be obtained using linear regression, and, specifically, are obtained using a value $a_{\xi k}$, that results from solving the following simultaneous equations of equation (3). Here, the feature value of the feature Fk of the document ID n is represented by $f_{n\xi k}$ and the evaluation value of the document ID n is represented by $e_n$. Also, the ID sequence of document IDs belonging to the target classification is represented as $\sigma_1, \sigma_2, \ldots \sigma_l$ from low to high numbers, and the non-missing feature values of the target classification are represented as $f_{\sigma l \xi 1}, f_{\sigma l \xi 2}, \ldots f_{\sigma l \xi k}$ from low to high classification numbers. Note that $\xi k$ is a numerical sequence representing the numbers of non-missing feature values in the target classification.

$$\begin{cases} \sum_i f_{\sigma_i \xi_1}\left(e_{\sigma_i} - \sum_{k=1}^{l} a_{\xi_k} f_{\sigma_i \xi_k} - a_0\right) = 0 \\ \sum_i f_{\sigma_i \xi_2}\left(e_{\sigma_i} - \sum_{k=1}^{l} a_{\xi_k} f_{\sigma_i \xi_k} - a_0\right) = 0 \\ \vdots \\ \sum_i f_{\sigma_i \xi_l}\left(e_{\sigma_i} - \sum_{k=1}^{l} a_{\xi_k} f_{\sigma_i \xi_k} - a_0\right) = 0 \\ \sum_i \left(e_{\sigma_i} - \sum_{k=1}^{l} a_{\xi_k} f_{\sigma_i \xi_k} - a_0\right) = 0 \end{cases} \qquad \text{Equation (3)}$$

$$0.0001 f_1 + 3 f_2 + 0.1 f_3 + f_4 + 0.5 f_5 \qquad \text{Equation (4)}$$

$$0.0 f_1 + f_2 + 3 f_4 + f_5 \qquad \text{Equation (5)}$$

$$0.0005 f_1 + 10 f_2 + 3 f_5 \qquad \text{Equation (6)}$$

Next, the first learning unit 4 computes first scores using the first function of equation (4) on the sample documents having the classification number 1, the first function of equation (5) on the sample documents having the classification number 2, and the first function of equation (6) on the sample documents having the classification number 3. The first learning unit 4 then outputs the data of FIG. 10 to which the respective computed first scores have been associated.

Step A6

Next, the feature vector generation unit 5 generates the second feature vector, using the data of FIG. 10 output by the first learning unit 4 as inputs (step A6). The second feature vector has G1, G2 and G3 as features. Then, with sample documents belonging to classification j, a value normalized such that the first score falls in the range [0, 1] is set as the feature value of the feature Gj (j=1, 2, 3), and feature values other than the feature Gj are set to 0.

For example, since the sample document having the document ID 1 has the classification number 3, the feature vector generation unit 5 generates a second feature vector in which a normalized value of the first score is set as the feature value of the feature G3, and the feature values of the features G1 and G2 are set to 0. Also, since the sample documents having the document IDs 2, 5 and 6 have the classification number 1, the feature vector generation unit 5 generates a second feature vector in which a normalized value of each first score is set as the feature value of the feature G1, and the feature values of the features G2 and G3 are set to 0. Also, since the sample documents having the document IDs 3 and 4 have the classification number 2, the feature vector generation unit 5 generates a second feature vector in which a normalized value of each first score is set as the feature value of the feature G2, and the feature values of the features G1 and G3 are set to 0. As described above, the feature vector generation unit 5 outputs the data of FIG. 11, as a result of generating the second feature vector of each sample document.

Next, the second learning unit 6 learns the function shown in following equation (8) as the second function, using the data of FIG. 11 output by the feature vector generation unit 5 as inputs (step A7). Specifically, the second function shown in equation (8) is obtained using $b_1$, $b_2$ and $b_3$ obtained as a result of solving the simultaneous equations of the following equation (7). Note that the value of the second feature vector of the classification j of document ID i is represented by $g_{ij}$. Although the classification number j is from 1 to c in the following equation, in the present embodiment example, it is assumed that the classification number j is from 1 to 3, as shown in FIG. 7, and that $b_1=1.5$, $b_2=1$, and $b_3=1.2$ are obtained by equation (7).

$$\begin{cases} \sum_i g_{i1}\left(e_i - \sum_{j=1}^{c} b_j g_{ij} - b_0\right) = 0 \\ \sum_i g_{i2}\left(e_i - \sum_{j=1}^{c} b_j g_{ij} - b_0\right) = 0 \\ \quad\vdots \\ \sum_i g_{ic}\left(e_i - \sum_{j=1}^{c} b_j g_{ij} - b_0\right) = 0 \\ \sum_i \left(e_i - \sum_{j=1}^{c} b_j g_{ij} - b_0\right) = 0 \end{cases}$$

Equation (7)

$$1.5g_1 + g_2 + 1.2g_3$$

Equation (8)

Learned results (first function, second function) are used in this way on new document sets obtained due to new queries. First, the ranking unit 8 receives input of a new document set (step A11).

Next, the ranking unit 8 specifies the missing pattern of each document (step A12). For example, with respect to a document having feature values such as shown in FIG. 12, the missing pattern reduction unit 2 specifies the missing pattern as being the missing pattern "F3, F4 missing". The missing pattern reduction unit 2 then determines that the missing pattern of this document matches a registered missing pattern, with reference to the missing pattern storage unit 7 (step A13).

Since this missing pattern has the classification number 3, the ranking unit 8 first calculates the first score as shown in the following equation (9) using equation (6).

$$0.0005 \times 550 + 10 \times 0.05 + 3 \times 0 = 0.775$$

Equation (9)

The ranking unit 8 then normalizes this first score 0.775 so as to fall in the range [0, 1] as shown in the following equation (10).

$$\frac{0.775 - 0.005}{3.8 - 0.005} \approx 0.203$$

Equation (10)

Figure 13:
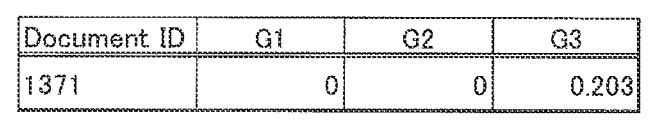

Note that this method of normalization involves calculating (first score−minimum value)/(maximum value−minimum value), and assumes maximum value and minimum value of the first scores of the sample documents belonging to the classification number 3 of the present embodiment example are 3.8 and 0.005, respectively. Therefore, the second feature vector of this document will be as shown in FIG. 13.

Then, the ranking unit 8 computes that the second score is 0.2436 as shown in the following equation (11) from this second feature vector using the second equation shown in equation (8).

$$1.5 \times 0 + 0 + 1.2 \times 0.203 = 0.2436$$

Equation (11)

The ranking unit 8 then similarly computes the second score for each input document, and ranks the documents in descending order of the second scores, and outputs the ranked documents.

The effects of the present embodiment will be described using the results of the present embodiment example. First, with a conventional method, learning is performed after supplementing missing feature values with an average value. For example, in the case where the average value of the feature values of F3 of a set of sample documents is 0, 0 will simply be substituted for F3 with respect to the document IDs 1, 3 and 4 for which the feature value of F3 is missing.

Here, since F3 originally is highly correlated with the evaluation values of documents, it is desirable that documents whose feature value of F3 is large will have a high evaluation value, and that a high final score is allocated. However, in the case where the document IDs 1, 3 and 4 are compared with the document ID 6 when the missing feature values are simply supplemented as described above, the sample documents having the document IDs 1, 3 and 4 whose feature values of F3 are small will have higher evaluation values, and the sample document having the document ID 6 whose feature value of F3 is large will have a lower evaluation value. As a result, a low score will be allocated to the document ID 6 for which the feature value of F3 is large.

As described above, with the conventional method there is a problem in that, in the case where a feature value that greatly influences the evaluation value is missing, that influence will be unfairly disvalued, and a high score is not given to documents having a high evaluation value.

On the other hand, according to the present embodiment example, since the function of the second score is learned from only the samples having the document IDs 2, 5 and 6 in which the feature value of F3 is not missing, final second score of documents whose feature value of F3 is large will also be high. Also, with regard to sample documents in which the feature value of F3 is missing, the final second score will increase the higher the evaluation value of the sample document based on the feature values that are not missing.

As described above, in the present embodiment example, since missing feature values are not supplemented with a different value, the second score can be calculated with emphasis on features that greatly influence the evaluation value, and a high score can be given to document having a high evaluation value.

While part or all of the abovementioned embodiment can be realized by Notes 1 to 12 described below, the present invention is not limited to the following description.

Note 1

A document evaluation apparatus for evaluating a document using a set of sample documents having a first feature vector consisting of a plurality of feature values and evaluation values of the documents, includes a data classification unit that classifies the set of sample documents, based on a missing pattern indicating a set of indices whose feature values are missing in the first feature vector, a first learning unit that uses feature values that are not missing in the first feature vector and the evaluation values to learn, for each classification, a first function for calculating a first score which is a weighted evaluation value for each classification, a feature vector generation unit that computes a feature value corresponding to each classification using the first score, and generates a second feature vector having the computed feature values, and a second learning unit that uses the second feature vector and the evaluation values to learn a second function for calculating a second score for evaluating a document targeted for evaluation.

Note 2

The document evaluation apparatus according to note 1 further includes a missing pattern reduction unit that measures an appearance frequency of the sample documents for each missing pattern, based on the set of sample documents, and matches a missing pattern whose appearance frequency is less than or equal to a set threshold to a missing pattern that is most similar to said missing pattern and whose appearance frequency is greater than the threshold.

Note 3

The document evaluation apparatus according to note 1 or 2 further includes a ranking unit that receives input of a set of documents targeted for evaluation, computes the second score for each document based on the second function, and ranks the documents based on the second scores.

Note 4

The document evaluation apparatus according to any one of notes 1 to 3, in which the feature vector generation unit generates the feature values constituting the second feature vector by normalizing the first scores so as to fall within a set range.

Note 5

A document evaluation method for evaluating a document using a set of sample documents having a first feature vector consisting of a plurality of feature values and evaluation values of the documents, includes the steps of (a) classifying the set of sample documents, based on a missing pattern indicating a set of indices whose feature values are missing in the first feature vector, (b) using feature values that are not missing in the first feature vector and the evaluation values to learn, for each classification, a first function for calculating a first score which is a weighted evaluation value for each classification, (c) computing a feature value corresponding to each classification using the first score, and generating a second feature vector having the computed feature values, and (d) using the second feature vector and the evaluation values to learn a second function for calculating a second score for evaluating a document targeted for evaluation.

Note 6

The document evaluation method according to note 5 further includes the step of (e) measuring an appearance frequency of the sample documents for each missing pattern, based on the set of sample documents, and matching a missing pattern whose appearance frequency is less than or equal to a set threshold to a missing pattern that is most similar to said missing pattern and whose appearance frequency is greater than the threshold.

Note 7

The document evaluation method according to note 5 or 6 further includes the step of (f) receiving input of a set of documents targeted for evaluation, computing the second score for each document based on the second function, and ranking the documents based on the second scores.

Note 8

The document evaluation method according to any one of notes 5 to 7, in which, in the step (c), the feature values constituting the second feature vector are generated by normalizing the first scores so as to fall within a set range.

Note 9

A computer-readable recording medium storing a program for evaluating by computer a document using a set of sample documents having a first feature vector consisting of a plurality of feature values and evaluation values of the documents, the program including commands for causing the computer to execute the steps of (a) classifying the set of sample documents, based on a missing pattern indicating a set of indices whose feature values are missing in the first feature vector, (b) using feature values that are not missing in the first feature vector and the evaluation values to learn, for each classification, a first function for calculating a first score which is a weighted evaluation value for each classification, (c) computing a feature value corresponding to each classification using the first score, and generating a second feature vector having the computed feature values, and (d) using the second feature vector and the evaluation values to learn a second function for calculating a second score for evaluating a document targeted for evaluation.

Note 10

The computer-readable recording medium according to note 9 further includes the step of (e) measuring an appearance frequency of the sample documents for each missing pattern, based on the set of sample documents, and matching a missing pattern whose appearance frequency is less than or equal to a set threshold to a missing pattern that is most similar to said missing pattern and whose appearance frequency is greater than the threshold.

Note 11

The computer-readable recording medium according to note 9 or 10 further includes the step of (f) receiving input of a set of documents targeted for evaluation, computing the second score for each document based on the second function, and ranking the documents based on the second scores.

Note 12

The computer-readable recording medium according to any one of notes 9 to 11, in which, in the step (c), the feature values constituting the second feature vector are generated by normalizing the first scores so as to fall within a set range.

Although the claimed invention was described above with reference to an embodiment, the claimed invention is not limited to the above embodiment. Those skilled in the art will appreciate that various modifications can be made to the configurations and details of the claimed invention without departing from the scope of the claimed invention.

This application is based upon and claims the benefit of priority of the prior Japanese Patent Application No. 2012-

38286 filed on Feb. 24, 2012, the entire contents of which are incorporated herein by reference.

Industrial Applicability

The present invention is can be applied to applications such as a retrieval system or a recommendation system that displays documents that are similar to a document evaluated highly by a user.

Description Of Reference Numerals

1 Document Evaluation Apparatus
2 Missing Pattern Reduction Unit
3 Data classification Unit
4 First Learning Unit
5 Feature Vector Generation Unit
6 Second Learning Unit
7 Missing Pattern Storage Unit
8 Ranking Unit
110 Computer
111 CPU
112 Main Memory
113 Memory Storage
114 Input Interface
115 Display Controller
116 Data Reader/Writer
117 Communication Interface
118 Input Device
119 Display Device
120 Recording Medium
121 Bus

The invention claimed is:

1. A document evaluation apparatus, realized by a computer, for evaluating a document using a set of sample documents having a first feature vector consisting of a plurality of feature values and evaluation values of the documents, comprising:
   a processor, wherein the processor is configured to
   classify the set of sample documents, based on a missing pattern indicating a set of indices whose feature values are missing in the first feature vector;
   use feature values that are not missing in the first feature vector and the evaluation values to learn, for each classification, a first function for calculating a first score which is a weighted evaluation value for each classification;
   compute a feature value corresponding to each classification using the first score, and generate a second feature vector having the computed feature values;
   use the second feature vector and the evaluation values to learn a second function for calculating a second score for evaluating a document targeted for evaluation; and
   measure an appearance frequency of the sample documents for each missing pattern, based on the set of sample documents, and match a missing pattern whose appearance frequency is less than or equal to a set threshold to a missing pattern that is most similar to said missing pattern and whose appearance frequency is greater than the threshold.

2. The document evaluation apparatus according to claim 1, wherein the processor is further configured to receive input of a set of documents targeted for evaluation, compute the second score for each document based on the second function, and rank the documents based on the second scores.

3. The document evaluation apparatus according to claim 1, wherein the processor is configured to generate the feature values constituting the second feature vector by normalizing the first scores so as to fall within a set range.

4. A document evaluation method for evaluating a document using a set of sample documents having a first feature vector consisting of a plurality of feature values and evaluation values of the documents, comprising the steps of:
   (a) classifying the set of sample documents, based on a missing pattern indicating a set of indices whose feature values are missing in the first feature vector;
   (b) using feature values that are not missing in the first feature vector and the evaluation values to learn, for each classification, a first function for calculating a first score which is a weighted evaluation value for each classification;
   (c) computing a feature value corresponding to each classification using the first score, and generating a second feature vector having the computed feature values;
   (d) using the second feature vector and the evaluation values to learn a second function for calculating a second score for evaluating a document targeted for evaluation; and
   (e) measuring an appearance frequency of the sample documents for each missing pattern, based on the set of sample documents, and matching a missing pattern whose appearance frequency is less than or equal to a set threshold to a missing pattern that is most similar to said missing pattern and whose appearance frequency is greater than the threshold.

5. A non-transitory computer-readable recording medium storing a program for evaluating by computer a document using a set of sample documents having a first feature vector consisting of a plurality of feature values and evaluation values of the documents, the program including commands for causing the computer to execute the steps of:
   (a) classifying the set of sample documents, based on a missing pattern indicating a set of indices whose feature values are missing in the first feature vector;
   (b) using feature values that are not missing in the first feature vector and the evaluation values to learn, for each classification, a first function for calculating a first score which is a weighted evaluation value for each classification;
   (c) computing a feature value corresponding to each classification using the first score, and generating a second feature vector having the computed feature values;
   (d) using the second feature vector and the evaluation values to learn a second function for calculating a second score for evaluating a document targeted for evaluation; and
   (e) measuring an appearance frequency of the sample documents for each missing pattern, based on the set of sample documents, and matching a missing pattern whose appearance frequency is less than or equal to a set threshold to a missing pattern that is most similar to said missing pattern and whose appearance frequency is greater than the threshold.

6. The document evaluation method according to claim 4 further includes the step of (f) receiving input of a set of documents targeted for evaluation, computing the second score for each document based on the second function, and ranking the documents based on the second scores.

7. The document evaluation method according to claim 4 in which, in the step (c), the feature values constituting the second feature vector are generated by normalizing the first scores so as to fall within a set range.

8. The computer-readable recording medium according to claim 5 further includes the step of (f) receiving input of a set of documents targeted for evaluation, computing the second score for each document based on the second function, and ranking the documents based on the second scores.

9. The computer-readable recording medium according to claim 5 in which, in the step (c), the feature values constituting the second feature vector are generated by normalizing the first scores so as to fall within a set range.

* * * * *